(12) United States Patent
Watkins

(10) Patent No.: US 6,369,859 B1
(45) Date of Patent: Apr. 9, 2002

(54) PATCHING DEGRADED VIDEO DATA

(75) Inventor: Daniel Watkins, Saratoga, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/465,618

(22) Filed: Dec. 17, 1999

(51) Int. Cl.$^7$ .................................................. H04N 5/21

(52) U.S. Cl. ....................................... 348/616; 348/607

(58) Field of Search ................................. 348/616, 607, 348/617, 624; H04N 5/21

(56) References Cited

U.S. PATENT DOCUMENTS 4,807,033 A * 2/1989 Keesen ....................... 348/616

* cited by examiner

Primary Examiner—Sherrie Hsia
(74) Attorney, Agent, or Firm—Suiter and Associates

(57) ABSTRACT

The present invention is directed to a system and method for repairing degraded data. In a first aspect of the present invention, a method for patching degraded video data includes receiving a first frame of video data and decoding the first frame of video data so as to enable the first frame of video data to be displayed on a display device. A portion of the decoded first frame of video data that is degraded is identified. The degraded portion of the first frame of video data is patched utilizing a second portion of video data wherein the degraded portion of the first frame of video data is patched with the second portion of video data to enable the first frame of video data and the second portion of video data to be displayed concurrently. In a second aspect of the present invention, a video data patching apparatus includes a source decoder capable of accepting video data, the source decoder capable of decoding the video data so as to enable the video data to be displayed on a display device. A video buffer is coupled to the source decoder, the video buffer suitable for supplying video data to a display device. A host processor is coupled to the source decoder and the video buffer, the host processor capable of implementing a video data patching process. A patch buffer is coupled to the host processor and the video buffer, the patch buffer capable of storing data suitable for patching degraded video data wherein a portion of a first frame of the video data is degraded, the video data patching process is initiated, including patching the first degraded portion of video data with a second portion of video data.

40 Claims, 6 Drawing Sheets

PATCHING DEGRADED VIDEO DATA

FIELD OF THE INVENTION

The present invention generally relates to the field of the display of video data, and particularly to the patching of degraded video data.

BACKGROUND OF THE INVENTION

Modern image viewing devices offer viewing capabilities and resolution greatly improved over previous viewing methods. For example, digital video disks (DVD) contain images of data stored digitally for increased resolution and clarity. However, device malfunctions and damage to the media containing the images may cause the data to become degraded. The source material, such as the media, may become scratched and otherwise damaged thereby decreasing the output quality. For example, if a digital video disk (DVD) became scratched due to improper handling, warped from excessive heat, and the like, a digital video disk (DVD) device may be unable to accurately communicate the data contained on the disk, such as audio, video and/or system information data. Further, with the greater resolution of modern display devices, such as high definition television (HD-TV) and the like, degraded output that may have been unnoticeable on a lower resolution device may become noticeable on the high-resolution display device.

Additionally, there may be limitations to the apparatus that cause the image to become degraded, such as the inability of an encoder to sustain the bit-rate, improper use of the encoder, and the like. For example, an encoder may receive data at a rate that the encoder cannot sustain, thereby causing the degradation of the data as the data is translated. Further, the communication of the data may cause degradation. For instance, the rate of transfer of the data may be too fast, too slow, and/or the data may be transferred at an inconsistent rate causing the image to be improperly decoded and viewed. Interruptions and line noise may also cause the data to become corrupted, resulting in a degraded data output. Further, non-compliant video compact disks (VCD) or digital video disks (DVD) may also cause degraded video output.

One method used to address this problem involved reprocessing the entire frame of degraded data to improve the quality of the data. However, this reprocessing often consumed valuable system resources, thereby further overtaxing the system. For example, a frame of degraded data was often reprocessed and encoded by a source decoder to enable the data to be displayed on a display device. This reprocessing may limit the continued viewing of the video data, thereby further limiting a user's viewing enjoyment.

SUMMARY OF THE INVENTION

Accordingly, the present invention is directed to a system and method for patching degraded data. In a first aspect of the present invention, a method for patching degraded video data includes receiving a first frame of video data and decoding the first frame of video data so as to enable the first frame of video data to be displayed on a display device. A portion of the decoded first frame of video data that is degraded is identified. The degraded portion of the first frame of video data is patched utilizing a second portion of video data wherein the degraded portion of the first frame of video data is patched with the second portion of video data to enable the first frame of video data and the second portion of video data to be displayed concurrently.

In a second aspect of the present invention, a video data patching apparatus includes a source decoder capable of accepting video data, the source decoder capable of decoding the video data so as to enable the video data to be displayed on a display device. A video buffer is coupled to the source decoder, wherein the video buffer is suitable for supplying video data to a display device. A host processor is coupled to the source decoder and the video buffer. The host processor is capable of implementing a video data patching process. A patch buffer is coupled to the host processor and the video buffer. The patch buffer is capable of storing data suitable for patching degraded video data wherein a portion of a first frame of the video data is degraded. The video data patching process is initiated, including patching the first degraded portion of video data with a second portion of video data.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 6, exemplary embodiments of the present invention are shown. Video data may be communicated in a wide variety of ways. For example, video data may be contained on media suitable to be read and displayed by a media-playing device, such as a digital video disk (DVD) player. Typically, video data contained on a medium is compressed so as to enable a greater amount of data to be stored on the medium. This data may be decoded for display on a display device. Additionally, video data may be divided into frames wherein each frame may be utilized to display a progressing image. For example, in a typical film projector, each frame corresponds to an image that when displayed in a sequential order enables a user to view motion video. In another example, a digital video disk (DVD) device may utilize frames that require data contained in the previous and/or subsequent frames to the desired frame so as to enable viewing of the image. In this way, data that is repeated between frames on the digital video disk (DVD) need only be stored once, thereby conserving storage space on the digital video disk (DVD).

Figure 1:
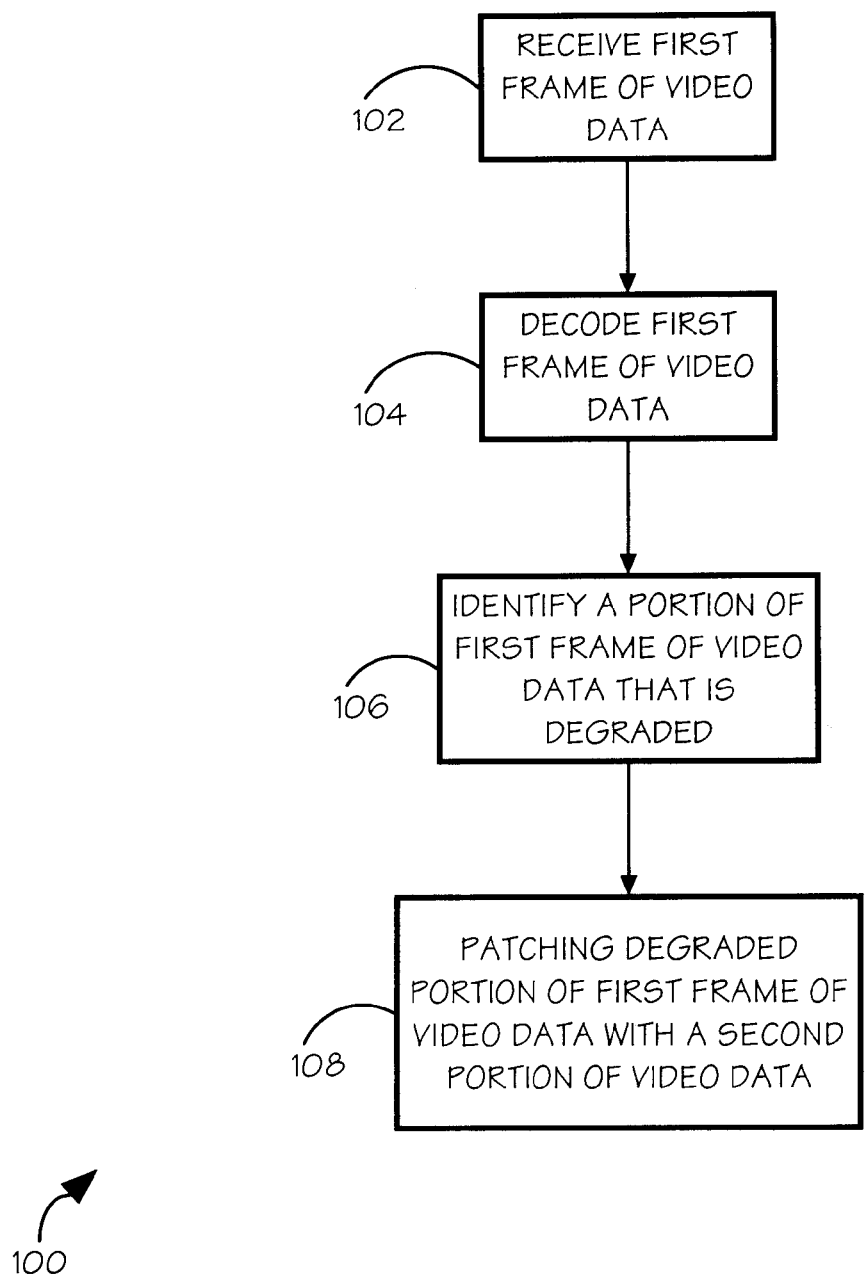
FIG. 1 is a flow diagram illustrating an exemplary method of the present invention wherein a degraded portion of video data is patched.

Referring now to FIG. 1, an exemplary embodiment 100 of the present invention is shown. A first frame of video data is received 102. Once received, the first frame of video data is decoded 104 so as to enable the first frame of video data to be displayed on a display device. If a portion of the first frame of video data is identified as degraded 106, the degraded portion of the first frame of video data is patched with a second portion of video data 108. Thus, only the degraded portion of the first frame of video data need be repaired, thereby conserving system resources. For example the second portion of video data may include an interpolated portion of the first frame of video data, a portion interpolated from both the first frame of video data and the second frame of video data, and the like.

Degraded video data may be identified in a variety of methods. In a first embodiment, a user may select a degraded portion of video data as displayed on a display device. For example, a user may use a mouse to drag a box bracketing the degraded portion of video data, utilize a pop-up menu, or any other method utilized to select a portion of a display as contemplated by a person of ordinary skill in the art. In a further exemplary embodiment, detecting a device malfunction may be utilized to identify degraded video data. For instance, if a read error was detected as a digital video disk (DVD) player read data from a digital video disk (DVD), the patching process may be initiated to repair the degraded portion of data. In an additional embodiment, a section of displayed data may be utilized to identify and patch degraded video data. For example, a user may identify an area of data that is consistently degraded when displayed on a display device, such as the lower left one-eighth of the display area of the display device as shown by the dashed line 318 in FIG. 3. The user may then initiate a patching process wherein that portion of the display is continuously patched, thereby improving the quality of the video display. A sequence of patches for a given playback may be stored on the player for future playback or stored on the digital video disk (DVD). In this way, the user does not need to identify the patch area candidates during playback, processing of this is not needed.

Figure 2:
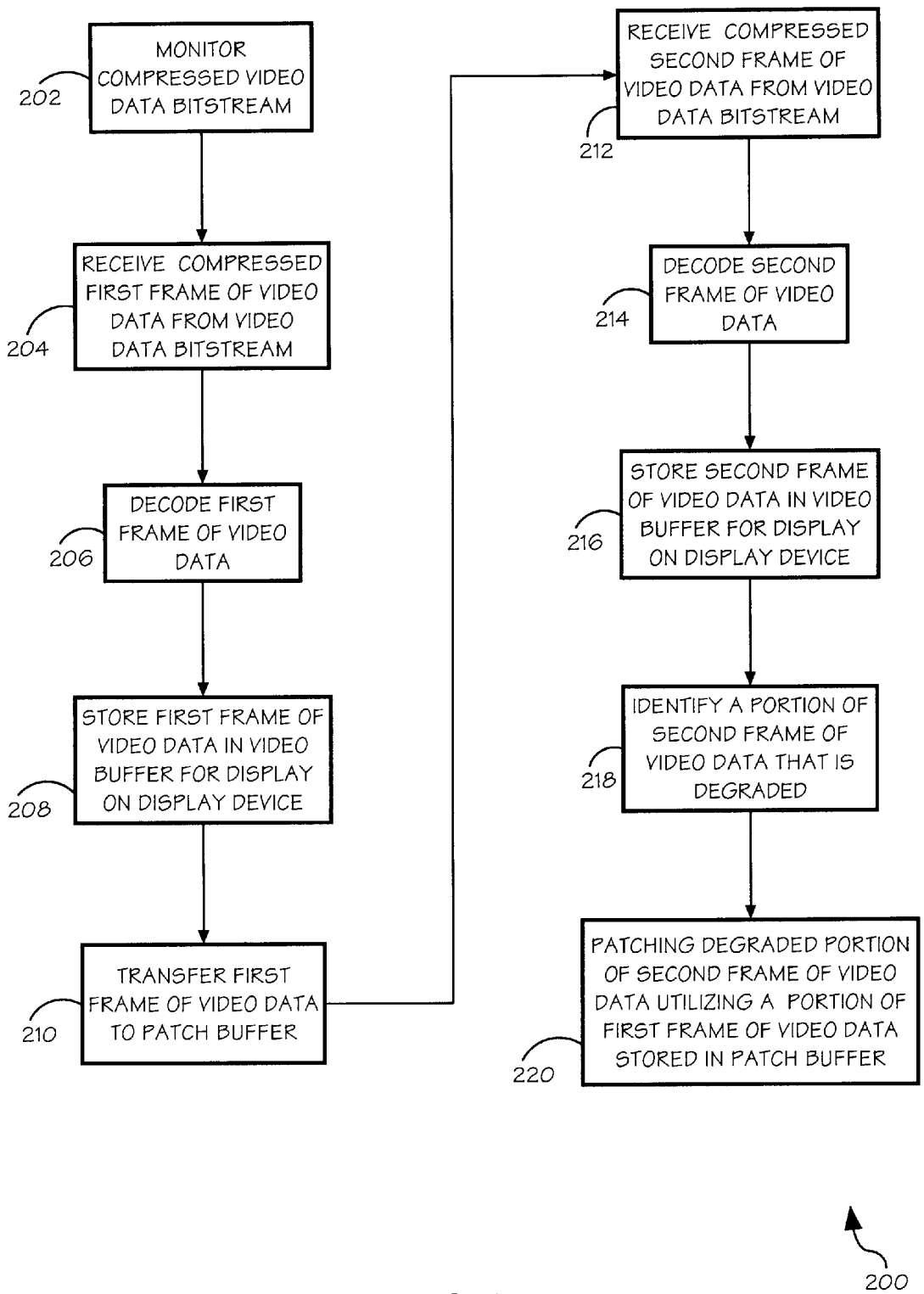
FIG. 2 is a flow diagram illustrating an additional exemplary method of the present invention wherein degraded video data received from a digital video disk (DVD) is patched.

Referring now to FIG. 2, an additional exemplary method 200 of the present invention is shown wherein degraded video data received from a digital video disk (DVD) is patched. A compressed video bitstream is read from a digital video disk (DVD) and monitored 202 for header information, rate of data transfer, and the like. A compressed first frame of video data is received from the compressed video data bitstream 204. The first frame of video data is then decoded 206. For example, video data may be compressed as MPEG-2 (Motion Pictures Experts Group), thereby requiring the data to be decoded so as to enable the data to be displayed on a display device. The first frame of video data is then stored in a video buffer to await display on the display device 208. Once the video data is transferred to the video buffer, the first frame of video data may also be copied to a patch buffer 210, or both transfers may happen simultaneously.

Next, a second frame of video data is received from the video data bitstream 212. The second frame is also decoded to enable viewing on the display device 214, and stored in a video buffer to be transferred to the display device 216. If a portion of the second frame of video data that is degraded is identified 218, the degraded portion of the second frame of video data may be patched utilizing a portion of the first frame of video data stored in the patch buffer 220. In this way, data contained in the first frame of video data may be used to repair the second frame of video data. Additionally, only a portion of the first frame of video data need be utilized to patch the degraded portion of the second frame of video data, thereby conserving system resources, such as processing, decoding, data transfer capabilities, and the like. Although receiving and storing frames of video data in sequence is discussed, it should be realized that frames may be received as a group, and then decoded and patched without departing from the spirit and scope of the present invention, the previous example merely an exemplary embodiment thereof. Further, a plurality of frames, i.e. "n" number of frames, may be both patched and utilized to provide patching data. Moreover, multiple patches on a frame may be done, as well as patches in different sizes and shapes without departing from the spirit and scope of the present invention.

In an additional embodiment, occurrences of the utilization of the patching process may be stored so as to enable the automatic patching of the degraded video data upon re-receipt of the degraded video data corresponding to the stored occurrence. In this way, video data previously patched by an audio/visual receiver may be automatically patched without requiring additional system or user input.

Figure 3:
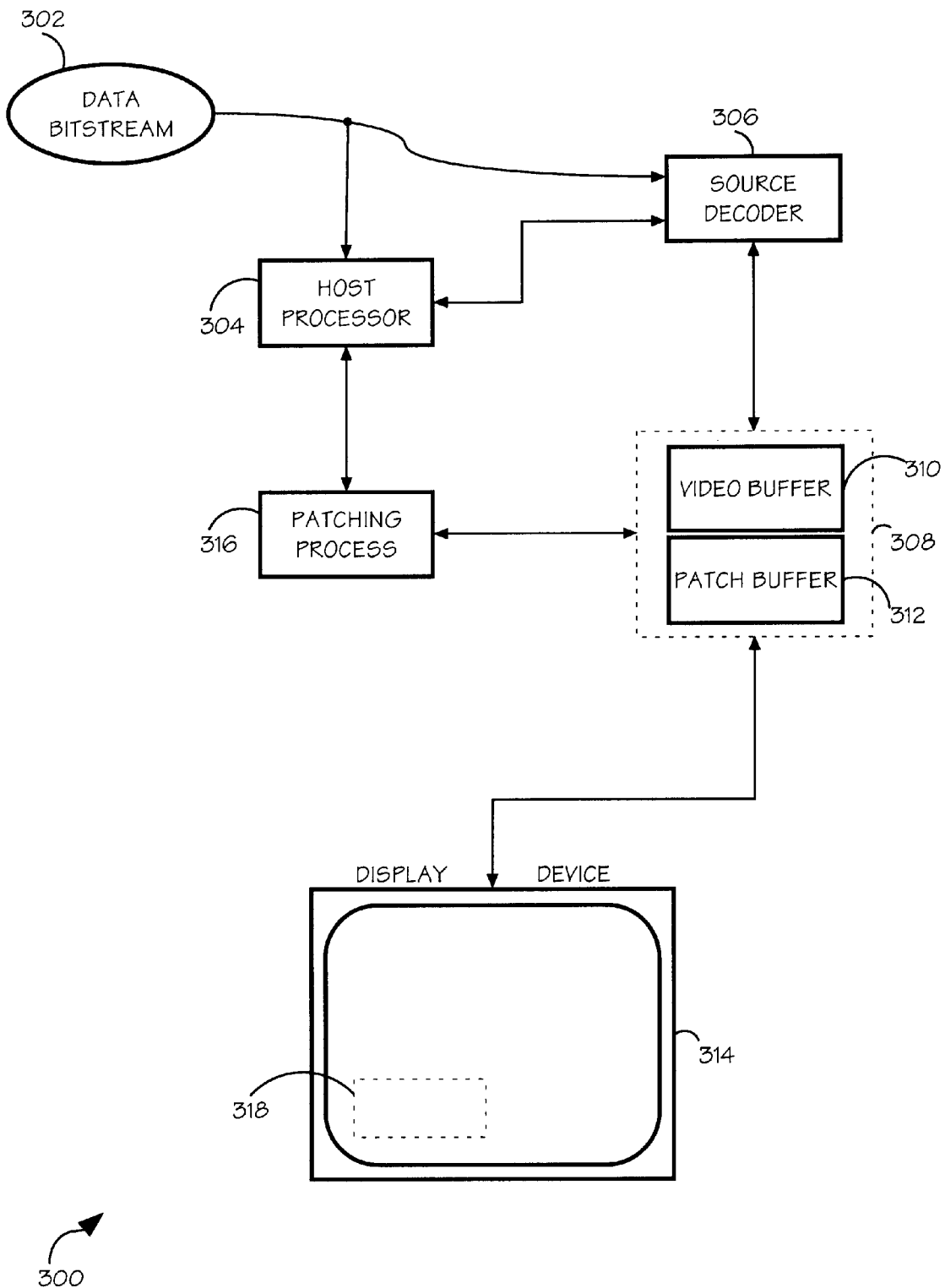
FIG. 3 is a block diagram depicting an additional exemplary embodiment of the present invention wherein the organizational structure of a hardware and software architecture of the present invention is shown.

Referring now to FIG. 3, a block diagram of the organizational structure of a hardware and software architecture of an exemplary embodiment 300 of the present invention is shown. A data bitstream 302 including video data is communicated. A host processor 304 monitors the compressed video data bitstream, including receiving header information, and coordinates the decoding and display of the video data. A source decoder 306 is utilized to decode the compressed video data to decoded uncompressed video data capable of being displayed on the display device. The source decoder 306 sends decoded uncompressed data to a local buffer 308 to be stored for display on a display device 314. The local buffer may include a video buffer 310 for storing images for display and a patch buffer 312 for storing patch data utilized to patch degraded video data. A patching process 316, which may be implemented as hardware and/or software, may utilize the host processor 304 and local buffer 308 to implement exemplary methods of the present invention. The host processor 304 may fill the video buffer 310 from the patch buffer 312 in response to identified degraded video data. In an exemplary embodiment, the video buffer 310 is filled by the patch buffer 312 through a direct memory access (DMA) procedure in which state machine hardware steps are utilized to send data from one area of memory to another without using the host processor. The host processor 304 may control the amount of frames stored in the patch buffer 312, based upon programming or user interaction.

Figure 4:
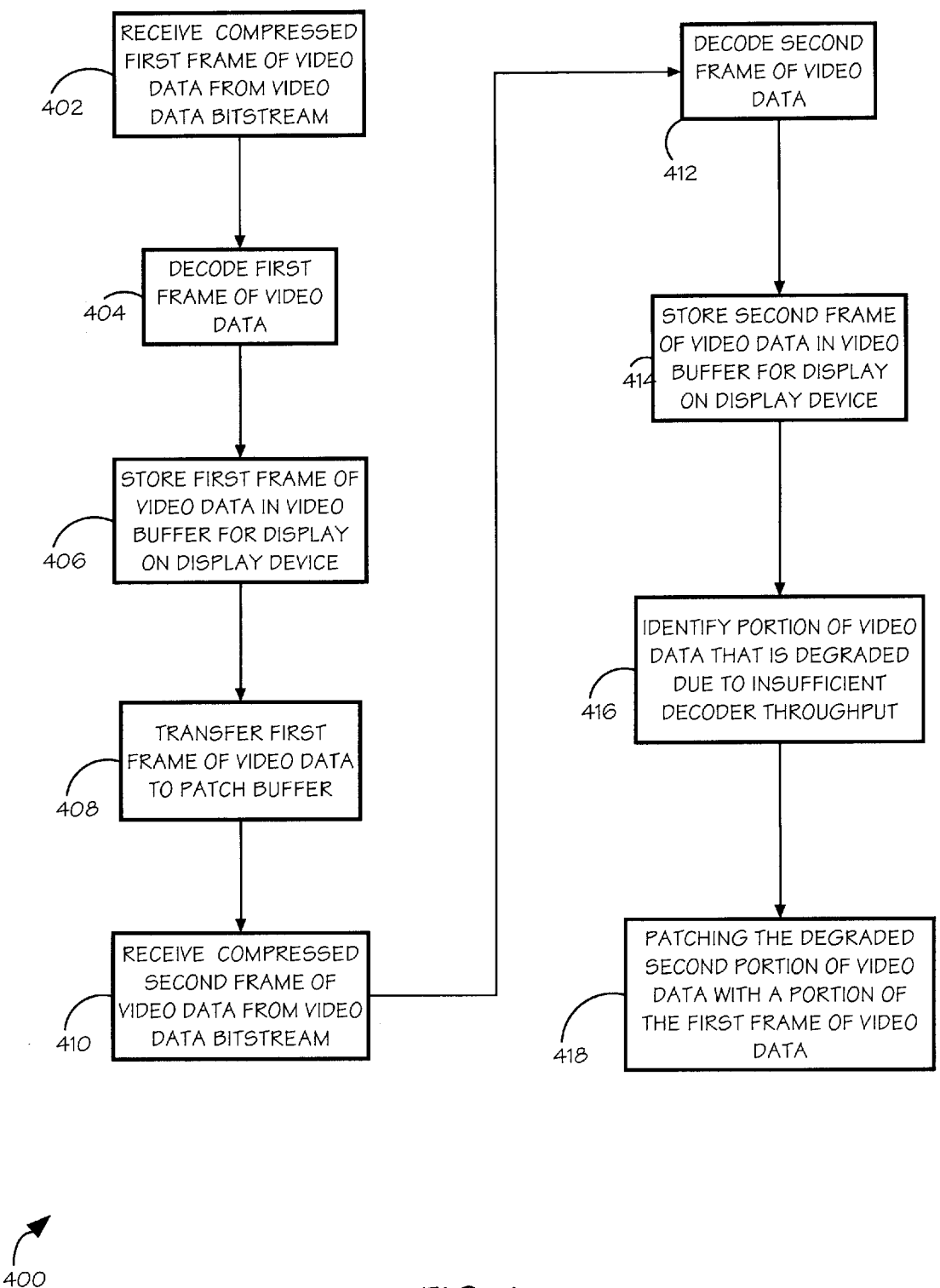
FIG. 4 is a flow diagram depicting an exemplary method of the present invention wherein a frame of video data including a portion of video data degraded due to insufficient decoder throughput is patched.

Referring now to FIG. 4, an additional exemplary method 400 of the present invention is shown wherein a frame of video data including a portion of video data degraded due to insufficient decoder throughput is patched. A first frame of compressed video data is received from a video bitstream 402. The first frame of video data is then decoded 404 and stored in a video buffer for display on a display device 406. The first frame of video data is also stored to a patch buffer 408. A second frame of video data is received from a bitstream 410, decoded 412 and stored 414 for display on the display device. If the decoder is unable to decode the video data in the time required, a portion of the video data may become degraded due to the insufficient decoder throughput 416.

The degraded portion of the second frame of video data may be patched with a portion of the first frame of video data stored in the patch buffer 418. For example, this portion may be repeated as uncompressed video data. In this way, the portion corresponding to the degraded portion due to the insufficient decoder throughput may be repeated, thereby conserving system resources and enabling improved viewing. Although the degradation of video data due to insufficient decoder throughput is discussed, a variety of decoding problems may be addressed by the present invention without departing from the spirit and scope thereof, such as decoder limitations, improper use of the decoder, and the like. For example, the decoder may not be able to sustain the reconstruction rate and/or the decoder may be used improperly, such as the decoding of unsupported formats.

Figure 5:
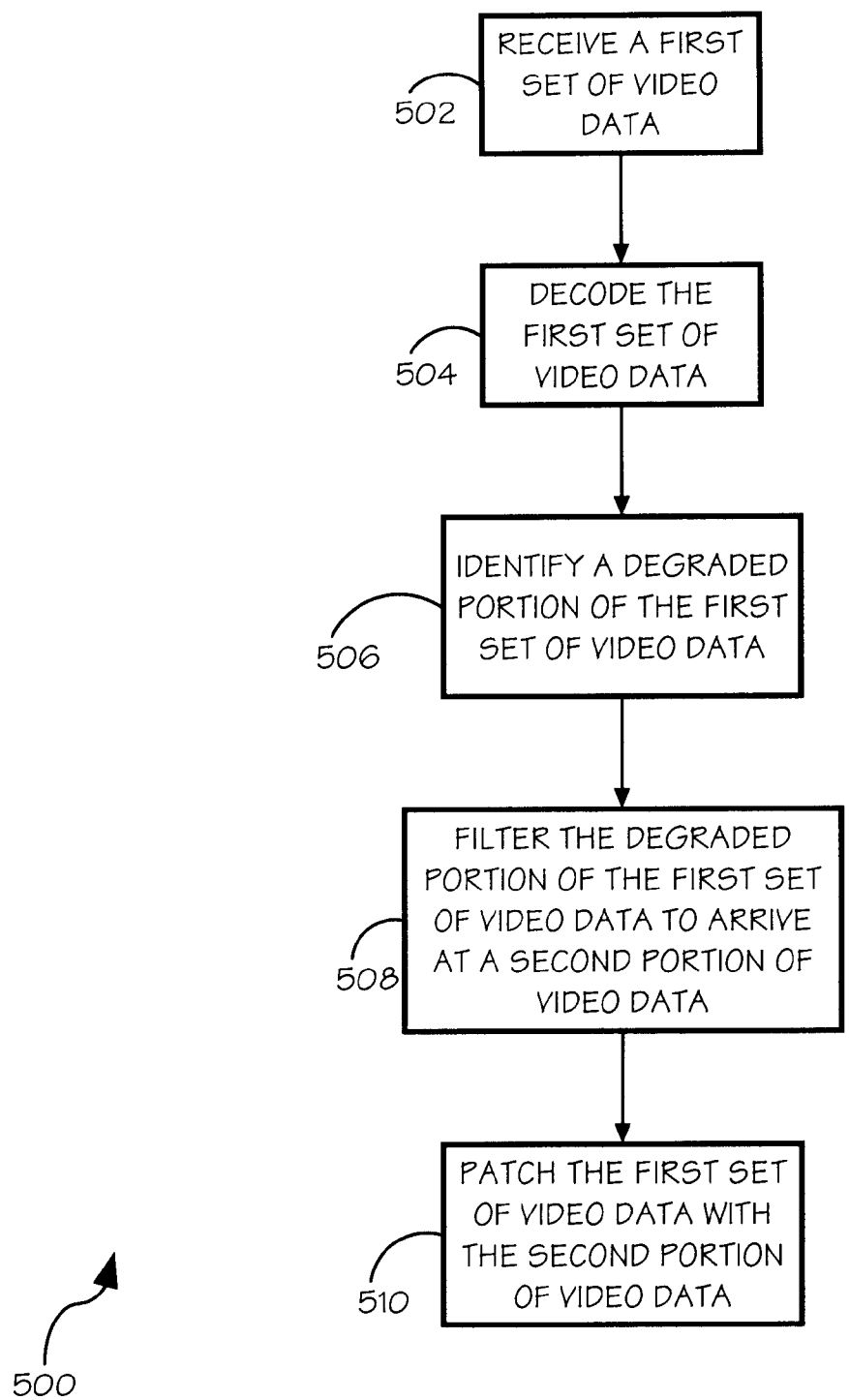
FIG. 5 is a flow diagram depicting an additional exemplary method of the present invention wherein a portion of degraded video data is patched with a filtered portion is shown.

Referring now to FIG. 5, an exemplary method 500 of the present invention is shown wherein a portion of degraded video data is patched with a filtered portion. A first frame of video data is received 502 and decoded 504 to enable viewing on a display device. If a portion of the first frame of video data is identified as degraded 506, that portion may be filtered to obtain a second portion of video data with improved viewing characteristics, such as color, clarity, accuracy, and the like 508. The second portion of video data may then be used to patch the first set of video data 510.

A variety of filtering methods that may be utilized by the present invention yet not depart from the spirit and scope thereof. For example, temporal filtering may be utilized to improve the quality of the video data. Temporal filtering may utilize not only spatial changes within the video frame, but temporal changes between video frames. For instance, a pixel may be interpolated from pixels positioned adjacent to the desired pixel in the first frame of video data. The pixel may also be interpolated from pixels positioned both adjacent to and occupying the same position as the desired pixel in frames ordered previous to and subsequent from the desired frame. In an exemplary embodiment, the portion of degraded video may be temporally filtered utilizing data contained in the patch buffer of frames previously displayed and may also be filtered from data contained in the video buffer and/or patch buffer of frames that have yet to be displayed to arrive at a second portion of video data suitable for patching. Although temporal filtering has been described, it should be apparent to a person of ordinary skill in the art that a variety of filtering methods may be employed by the present invention and not depart from the spirit and scope thereof.

Figure 6:
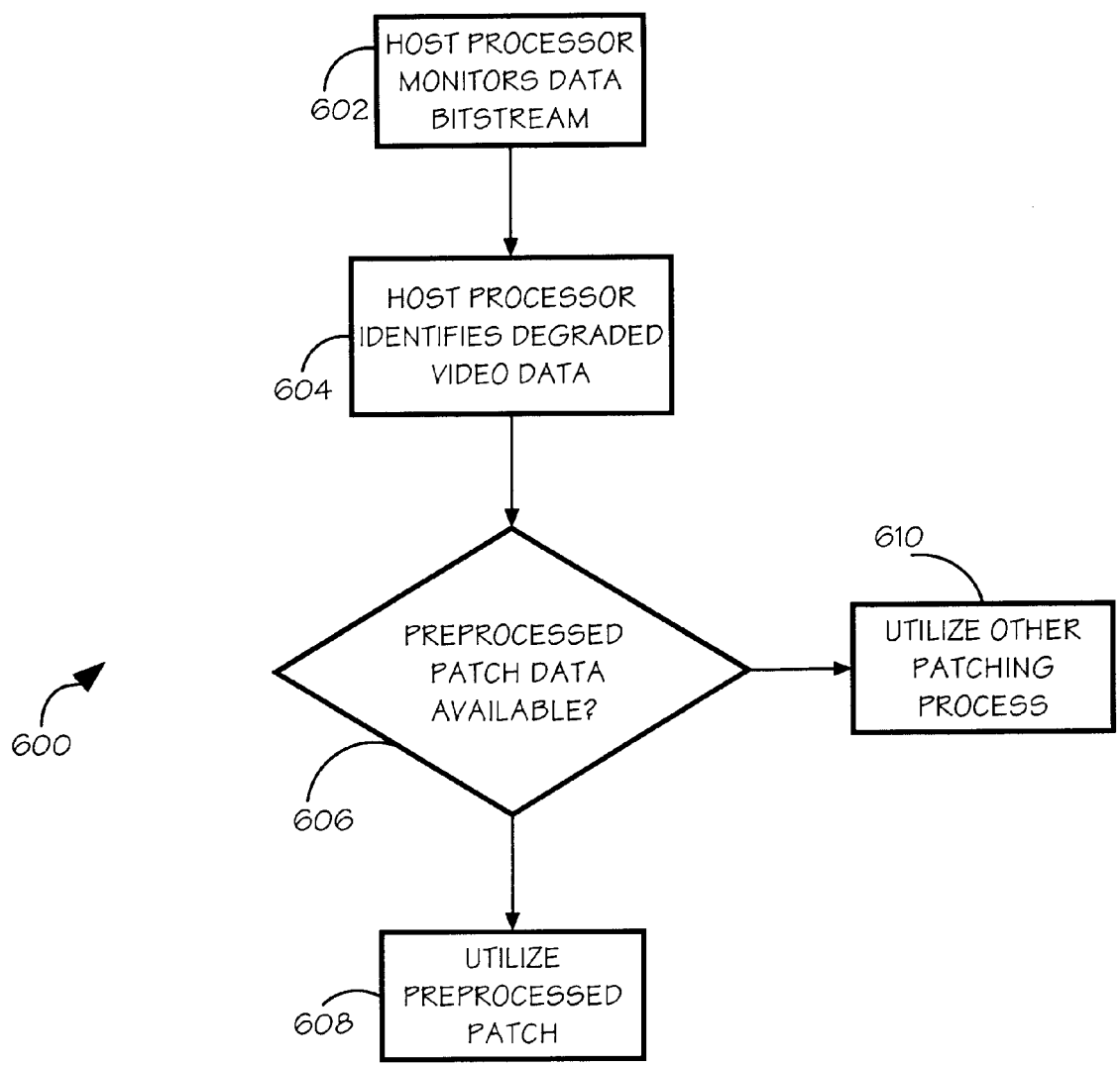
FIG. 6 is a flow diagram illustrating an additional exemplary method of the present invention wherein patching data is preprocessed so as to be available for patching degraded video data.

Referring now to FIG. 6, an exemplary method 600 of the present invention is shown wherein patching data is preprocessed so as to be available for patching degraded video data. Preprocessing of patching data may involve storing the data in an uncompressed format so as to be capable of display without utilizing a decoder. A host processor monitors a data bitstream 602. If the host processor identifies degraded video data 604, the host processor may query if a preprocessed patch is available 606. If the preprocessed patch is available, it may be utilized to repair the degraded video data 608. However, if the preprocessed patch is not available, other patching processes may be utilized 610, such as the exemplary methods 100 (FIG. 1), 200 (FIG. 2), 400 (FIG. 4), 500 (FIG. 5) and the like may be used.

A patch may be preprocessed utilizing a variety of methods. For example, a provider of a video-playing device may store preprocessed patches of titles that are known to have degraded portions. This storing and preprocessing of patches may be desirable in instances wherein it is undesirable or impossible to fix the source material. The patches may be stored on the video-playing device utilizing a memory device, such as semiconductor and/or media based memory, to be available should the video-playing device display the title. For example, a certain scene in a movie may be known to contain a degraded portion. That degraded portion may be patched utilizing a preprocessed patch stored by the device, thereby improving the viewing experience. Further, the preprocessed patch may be stored as an uncompressed patch on the medium. Since the portion of data that is stored is small, the transfer and communication of the preprocessed patch through the device may utilize only a small portion of the available bandwidth. In an exemplary embodiment, if a digital video disk (DVD) was to be used, the digital video disk (DVD) syntax may need to be changed if multiplexing between the digital video disk (DVD) compressed data, such as MPEG-2 (Motion Pictures Experts Group), and non-DVD, i.e. uncompressed data patch, on a disk, such as a DVD hybrid disk, is unreaonsable in the system. For instance, the DVD syntax may be changed wherein previously unused portions of the medium and/or unused portions of the data bitstream are utilized to communicate the uncompressed data on systems that are not suitable for multiplexing.

Although the invention has been described with a certain degree of particularity, it should be recognized that elements thereof may be altered by persons skilled in the art without departing from the spirit and scope of the invention. One of the embodiments of the invention can be implemented as sets of instructions resident in the memory of one or more audio/video receivers. Until required by the audio/video receiver, the set of instructions may be stored in another readable memory device, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of an audio/video receiver and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

In exemplary embodiments, the methods disclosed may be implemented as sets of instructions or software readable by a video device. Further, it is understood that the specific order or hierarchy of steps in the methods disclosed are examples of exemplary approaches. Based upon design preferences, it is understood that the specific order, or hierarchy of steps in the method can be rearranged while remaining within the scope of the present invention. The attached method claims present elements of the various steps in a sample order, and are not meant to be limited to the specific order or hierarchy presented.

It is believed that patching degraded video of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for patching degraded video data, comprising:
   receiving a first frame of video data;
   decoding said first frame of video data so as to enable said first frame of video data to be displayed on a display device;
   identifying a portion of said decoded first frame of video data that is degraded; and
   patching said degraded portion of said first frame of video data utilizing a second portion of video data;
   wherein said degraded portion of said first frame of video data is patched with said second portion of video data to enable said first frame of video data and said second portion of video data to be displayed concurrently.

2. The method as described in claim 1, wherein the received first frame of video data is compressed and the second portion of video data is uncompressed data.

3. The method as described in claim 2, wherein the first frame of video data and the second portion of video data are multiplexed.

4. The method as described in claim 2, wherein digital video disk (DVD) syntax is reformatted to enable the first frame of video data and the second portion of video data to be communicated in an audio/video receiver.

5. The method as described in claim 1, wherein the second portion of video data corresponds to the degraded portion of the first frame of video data.

6. The method as described in claim 1, wherein said patching includes providing the second portion of video data corresponding to the degraded portion of the first frame of video data, the second portion of video data obtained from a second frame of video data ordered previously to the first frame of video data.

7. The method as described in claim 6, wherein the degraded portion of the first frame of video data is identified, providing the second portion of video data obtained from the second frame of video data order previously to the first frame of video data, wherein the second portion of video data corresponds to the degraded portion of the first from of video data so as to repeat the portion of the second frame of video data in place of the degraded portion of the first frame of video data.

8. The method as described in claim 1, wherein the video data is degraded due to at least one of improper use of an encoder resulting in noncompliant data and inadequate decoding of the video data, including insufficient decoder throughput.

9. The method as described in claim 1, wherein said patching the degraded portion of the first frame of video data includes filtering the degraded portion so as to obtain a second portion of video data.

10. The method as described in claim 9, wherein said filtering includes temporal filtering, including interpolating a desired pixel from at least one pixel positioned adjacent to the desired pixel in the first frame of video data and interpolating temporally from at least one pixel in a second frame of video data, the second frame of video data ordered at least one of previous to and subsequent from the first frame of video data.

11. The method as described in claim 1, wherein the second portion of video data is interpolated.

12. The method as described in claim 1, wherein said identifying a portion of the first frame of video data that is degraded includes at least one of utilizing user input, notifying by a device of error and previously stored provider information.

13. The method as described in claim 1, wherein the degraded portion of the first frame of video data is patched with the second portion of video data, storing an occurrence of the patching process so as to enable the patch to be applied automatically in response to the receipt of the first frame of video data corresponding to the stored occurrence.

14. The method as described in claim 1, wherein the video data is streaming.

15. The method as described in claim 1, wherein the video data includes at least one of video, audio and system information.

16. A video data patching apparatus, comprising:
   a source decoder capable of accepting video data, said source decoder capable of decoding the video data so as to enable the video data to be displayed on a display device;
   a video buffer coupled to said source decoder, said video buffer suitable for supplying the video data to said display device;
   a host processor coupled to said source decoder and said video buffer, said host processor capable of implementing a video data patching process; and
   a patch buffer coupled to said host processor and said video buffer, said patch buffer capable of storing data suitable for patching degraded video data;
   wherein a portion of a first frame of the video data is degraded, the video data patching process is initiated, including patching the first degraded portion of video data with a second portion of video data.

17. The apparatus as described in claim 16, wherein the first frame of video data is compressed and the second portion of video data is uncompressed data.

18. The apparatus as described in claim 16, wherein the first frame of video data and the second portion of video data are multiplexed.

19. The apparatus as described in claim 16, wherein said patching includes providing the second portion of video data corresponding to the degraded portion of the first frame of video data, the second portion of video data obtained from a second frame of video data ordered previously to the first frame of video data.

20. The apparatus as described in claim 19, wherein the video data is degraded due to inadequate decoding of the video data, including insufficient decoder throughput.

21. The apparatus as described in claim 16, wherein the host processor through at least one of programming and viewer selection has information defining at least one of how many compressed frames of video data should be saved and timing of the second portion of video data to the video buffer from the patch buffer.

22. The apparatus as described in claim 16, wherein said patching the degraded portion of the first frame of video data includes filtering the degraded portion so as to obtain a second portion of video data.

23. The apparatus as described in claim 22, wherein said filtering includes temporal filtering, including interpolating a desired pixel from at least one pixel positioned adjacent to the desired pixel in the first frame of video data and interpolating temporally from at least one pixel in a second frame of video data, the second frame of video data ordered at least one of previous to and subsequent from the first frame of video data.

24. The apparatus as described in claim 16, wherein the second portion of video data is interpolated.

25. The apparatus as described in claim 16, wherein the portion of the first frame of video data is identified as degraded by including at least one of utilizing user input, notifying by a device of error and previously stored provider information.

26. The apparatus as described in claim 16, wherein the degraded portion of the first frame of video data is patched with the second portion of video data, storing an occurrence of the patching process so as to enable the patch to be applied automatically in response to receipt of the first frame of video data corresponding to the stored occurrence.

27. The apparatus as described in claim 16, wherein the video data includes at least one of video, audio and system information.

28. A program of instructions storable on a medium readable by an audio/video receiver for causing the audio/video receiver to execute steps for patching degraded video data, the steps comprising:

receiving a first frame of video data;

decoding said first frame of video data so as to enable said first frame of video data to be displayed on a display device;

identifying a portion of said decoded first frame of video data that is degraded; and patching said degraded portion of said first frame of video data utilizing a second portion of video data;

wherein said degraded portion of said first frame of video data is patched with said second portion of video data to enable said first frame of video data and said second portion of video data to be displayed concurrently.

29. The program of instructions as described in claim 28, wherein the received first frame of video data is compressed and the second portion of video data is uncompressed data.

30. The program of instructions as described in claim 29, wherein the first frame of video data and the second portion of video data are multiplexed.

31. The program of instructions as described in claim 29, wherein digital video disk (DVD) syntax is reformatted to enable the first frame of video data and the second portion of video data to be communicated in said audio/video receiver.

32. The program of instructions as described in claim 28, wherein the second portion of video data corresponds to the degraded portion of the first frame of video data.

33. The program of instructions as described in claim 28, wherein said patching includes providing the second portion of video data corresponding to the degraded portion of the first frame of video data, the second portion of video data obtained from a second frame of video data ordered previously to the first frame of video data.

34. The program of instructions as described in claim 28, wherein the degraded portion of the first frame of video data is identified, providing the second portion of video data obtained from the second frame of video data order previously to the first frame of video data, wherein the second portion of video data corresponds to the degraded portion of the first from of video data so as to repeat the portion of the second frame of video data in place of the degraded portion of the first frame of video data.

35. The program of instructions as described in claim 28, wherein the video data is degraded due to at least one of improper use of an encoder resulting in noncompliant data and inadequate decoding of the video data, including insufficient decoder throughput.

36. The program of instructions as described in claim 28, wherein said patching the degraded portion of the first frame of video data includes filtering the degraded portion so as to obtain a second portion of video data.

37. The program of instructions as described in claim 36, wherein said filtering includes temporal filtering, including interpolating a desired pixel from at least one pixel positioned adjacent to the desired pixel in the first frame of video data and interpolating temporally from at least one pixel in a second frame of video data, the second frame of video data ordered at least one of previous to and subsequent from the first frame of video data.

38. The program of instructions as described in claim 28, wherein the second portion of video data is interpolated.

39. The program of instructions as described in claim 28, wherein said identifying a portion of the first frame of video data that is degraded includes at least one of utilizing user input, notifying by a device of error and previously stored provider information.

40. The program of instructions as described in claim 28, wherein the degraded portion of the first frame of video data is patched with the second portion of video data, storing an occurrence of the patching process so as to enable the patch to be applied automatically in response to the receipt of the first frame of video data corresponding to the stored occurrence.

* * * * *